United States Patent
Kodaira et al.

(10) Patent No.: US 10,908,401 B2
(45) Date of Patent: Feb. 2, 2021

(54) ZOOM LENS AND IMAGE PICKUP APPARATUS

(71) Applicant: CANON KABUSHIKI KAISHA, Tokyo (JP)

(72) Inventors: Masakazu Kodaira, Utsunomiya (JP); Masaru Sakamoto, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 190 days.

(21) Appl. No.: 16/156,283

(22) Filed: Oct. 10, 2018

(65) Prior Publication Data

US 2019/0113722 A1 Apr. 18, 2019

(30) Foreign Application Priority Data

Oct. 12, 2017 (JP) ................. 2017-198257

(51) Int. Cl.
*G02B 15/20* (2006.01)
*G03B 5/00* (2006.01)
*G03B 5/02* (2006.01)

(52) U.S. Cl.
CPC ............... *G02B 15/20* (2013.01); *G03B 5/00* (2013.01); *G03B 5/02* (2013.01); *G03B 2205/0046* (2013.01)

(58) Field of Classification Search
CPC .... G02B 15/173; G02B 15/14; G02B 27/646; G02B 13/18; G02B 9/34
USPC ....................................................... 359/687
See application file for complete search history.

(56) References Cited

U.S. PATENT DOCUMENTS

| | | | |
|---|---|---|---|
| 5,923,478 A | * | 7/1999 | Hashimura ......... G02B 15/173 359/686 |
| 9,417,440 B2 | | 8/2016 | Sakamoto |
| 9,588,323 B2 | | 3/2017 | Tatenuma et al. |
| 9,739,988 B2 | | 8/2017 | Sakamoto |
| 2016/0124199 A1 | | 5/2016 | Sanjo et al. |
| 2018/0011301 A1 | | 1/2018 | Kodaira |
| 2018/0143412 A1 | | 5/2018 | Sakamoto et al. |
| 2018/0203214 A1 | | 7/2018 | Sakamoto |
| 2018/0224640 A1 | * | 8/2018 | Shimomura ............ G02B 9/60 |
| 2018/0246303 A1 | | 8/2018 | Kodaira |
| 2018/0314060 A1 | | 11/2018 | Sakamoto |

FOREIGN PATENT DOCUMENTS

JP 2015018083 A 1/2015

* cited by examiner

*Primary Examiner* — Mohammed A Hasan
(74) *Attorney, Agent, or Firm* — Carter, Deluca & Farrell, LLP

(57) ABSTRACT

A zoom lens including, in order from an object side, a positive first unit configured not to be moved for zooming, a negative second unit configured to be moved for zooming, a positive third unit configured to be moved for zooming, a zooming lens group including a lens unit and configured to be moved for zooming, and a positive unit configured not to be moved for zooming, wherein the third unit includes positive and negative lenses, the second and third units move to an image side for zooming from a wide-angle end to a telephoto end, and focal lengths at the wide-angle end and the telephoto end, a zoom ratio, a space between the second unit third units and is maximum in a zoom range from the telephoto end to a predetermined focal length, and a space between the second third units at the telephoto end are properly set.

6 Claims, 8 Drawing Sheets

ZOOM LENS AND IMAGE PICKUP APPARATUS

BACKGROUND OF THE INVENTION

Field of the Invention

The present invention relates to a zoom lens and an image pickup apparatus.

Description of the Related Art

In conventional zoom lenses for television cameras, four-unit zoom lenses have been often used because the wide angle, high magnification and reduction in size and weight are relatively easy. The four-unit zoom lens is configured by a first lens unit having a positive refractive power and configured to be fixed during zooming, a second lens unit having a negative refractive power and configured to be moved for zooming, a third lens unit for correcting an image plane that varies with zooming, and a fourth lens unit having a positive refractive power for imaging, in order from an object side.

In recent years, there has been proposed a zoom lens for a television camera, in which a zooming unit having functions of a variator and a compensator is configured by three, or four or more movable units.

Japanese Patent Application Laid-Open No. 2015-18083 proposes a zoom lens having a first lens unit having a positive refractive power, a second lens unit having a negative refractive power and configured to be moved for zooming, a third lens unit having a positive refractive power and configured to be moved for zooming, and a fourth lens unit having a negative refractive power and configured to be moved for zooming.

When attempting to achieve compatibility between a wider angle and higher magnification, and reduction in size and weight, in the conventional four-unit zoom lens for a television camera, it is necessary to increase the refractive powers of the respective units, and there arises the problem that variations in various aberrations increase. In particular, when aberration correction is performed at a wide-angle end and a telephoto end, variations in the various aberrations in a focal length range ($fw \times Z^{0.95}$ to $fw \times Z^{0.78}$) including a focal length (for example, $fw \times Z^{0.84}$; fw represents a focal length at the wide-angle end) in an intermediate zoom state from the telephoto end increase, and performance deterioration especially in the periphery of a screen increases.

In Japanese Patent Application Laid-Open No. 2015-18083, three or four zooming units are caused to be moved with different loci when zooming is performed from the wide-angle end to the telephoto end. However, Japanese Patent Application Laid-Open No. 2015-18083 does not disclose the zoom loci in the focal length range (for example, $fw \times Z^{0.95}$ to $fw \times Z^{0.78}$) including the focal length (for example, $fw \times Z^{0.84}$) in the intermediate zoom state from the telephoto end in which the various aberrations increase, and effective aberration correction is not achieved.

SUMMARY OF THE INVENTION

The disclosure provides, for example, a zoom lens advantageous in a wide angle, high magnification, reduction in size and weight, and high performance over an entire focal length range.

In order to provide such a zoom lens, a zoom lens includes, in order from an object side to an image side, a first lens unit having a positive refractive power and configured not to be moved for zooming,
a zooming lens group including at least one lens unit and configured to be moved for zooming, and a fixed lens unit having a positive refractive power and configured not to be moved for zooming, wherein
the third lens unit includes at least a single lens having a positive refractive power, and at least a single lens having a negative refractive power,
the second lens unit and the third lens unit are configured to be moved from the object side to the image side for zooming from a wide-angle end to a telephoto end, and
a conditional expression $$1.10 < L2\,max/L2t < 2.20$$

is satisfied where fw is a focal length of the zoom lens at the wide-angle end, Z is a zoom ratio of the zoom lens, ftm is a focal length of the zoom lens in an intermediate zoom state of the zoom lens obtained by an expression $fw \times Z^{0.84}$, L2 max is a maximum interval between the second lens unit and the third lens unit in a zoom range from the telephoto end to the intermediate zoom state, and L2t is an interval between the second lens unit and the third lens unit at the telephoto end.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Next, features of respective numerical embodiments will be described.

A zoom lens of numerical embodiment 1 of the present invention includes, in order from an object side to an image side, a first lens unit having a positive refractive power and configured not to be moved for zooming, a second lens unit having a negative refractive power and configured to be moved for zooming, a third lens unit having a positive refractive power and configured to be moved for zooming, a fourth lens unit (zooming lens unit) having a negative refractive power and configured to be moved for zooming, and an imaging lens unit (fixed lens unit) having a positive refractive power for imaging. Further, the second lens unit and the third lens unit move from the object side to the image side in zooming from a wide-angle end to a telephoto end.

The third lens unit has at least one or more single lens having a positive refractive power, and at least one or more single lens having a negative refractive power.

When a focal length of the zoom lens at the wide-angle end is fw, a focal length of the zoom lens at the telephoto end is ft, a zoom ratio is Z, and a focal length in an intermediate zoom state is $$ftm = fw \times Z^{0.84} \tag{1},$$

and when a space which is a space between the second lens unit and the third lens unit and becomes maximum is L2 max in a zoom range from the telephoto end to the focal length ftm, and a space between the second lens unit and the third lens unit at the telephoto end is L2t, the zoom lens of the present invention satisfies $$1.10 < L2\ max/L2t < 2.20 \tag{2}.$$

In a conventional four-unit zoom lens, a locus of movement of the third lens unit is uniquely determined for image point correction (or focus compensation). More specifically, the third lens unit moves with such a locus as to draw convex to the object side, and moves closest to the object side in a zoom position where an imaging magnification of the second unit passes −1.

In the present invention, a zooming unit is configured by three or more movable units. Consequently, it is possible to set loci of movement of the second lens unit and the third lens unit arbitrarily.

More specifically, in the zoom range between the telephoto end and the focal length ftm (=fw×Z$^{0.84}$), the present invention has a zoom position in which the space between the second lens unit and the third lens unit is larger than at the telephoto end. Thereby, among light beams entering the third movable unit, an upper beam and a lower beam can be controlled. Thereby, a curvature of field that varies in an under (object side) direction is favorably corrected in a zoom range between the telephoto end and the focal length ftm.

Figure 7:
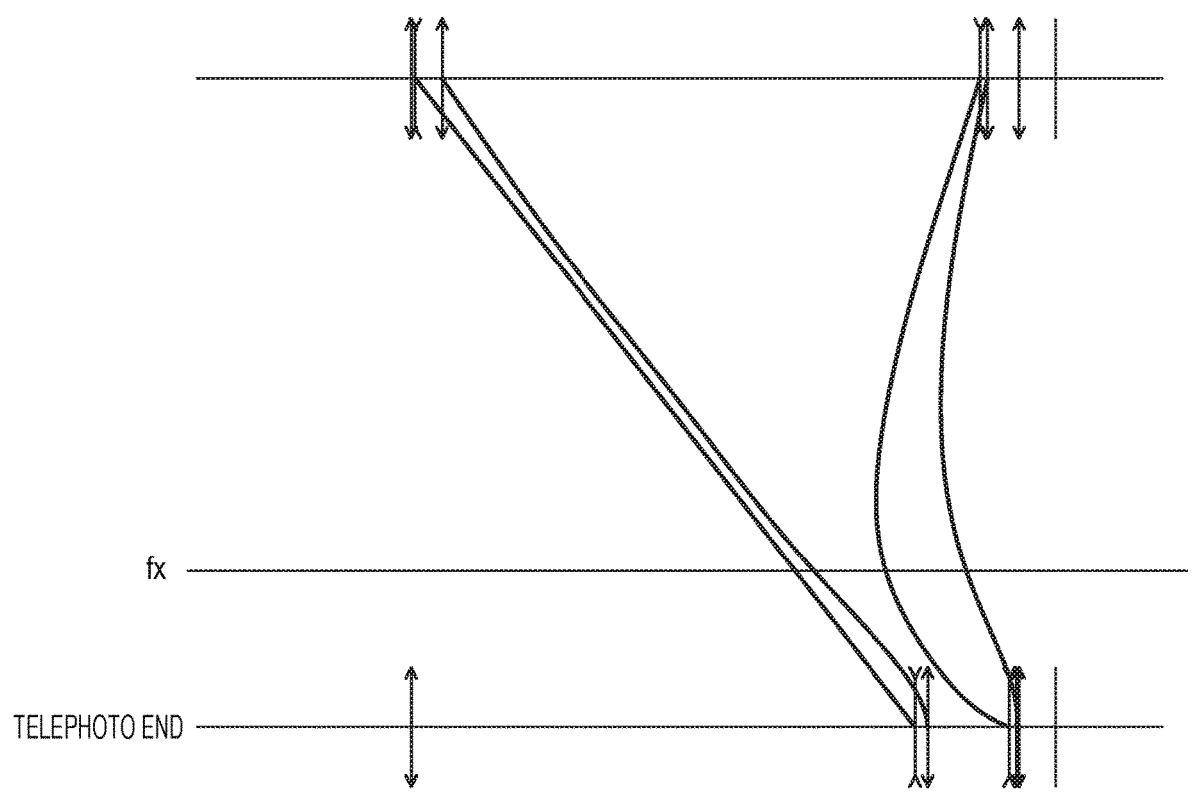
FIG. 7 is a schematic diagram illustrating a principle of the present invention.

FIG. 7 is a diagram schematically illustrating loci of zooming of an embodiment of the present invention. The loci of movement of the second lens unit U2, the third lens unit U3 and the fourth lens unit U4 from the wide-angle end to the telephoto end in the present invention are shown by solid lines. In the present invention, it can be confirmed that in the zoom range (the telephoto end to the focal length ftm), the space between the second lens unit and the third lens unit increases to the wide-angle end.

Conditional expression (1) defines a zoom range in which the zoom position where the space between the second lens unit and the third lens unit is larger than at the telephoto end is present.

Conditional expression (2) defines a ratio of a space which is the space between the second lens unit and the third lens unit and becomes maximum and a space at the telephoto end. When the ratio is above an upper limit value of conditional expression (2), the locus interferes with a locus of a fourth movable unit in a middle of zoom. Alternatively, in order to avoid interference, the refractive power of the third movable unit becomes strong, and favorable correction of image plane correction becomes difficult. When the ratio is below a lower limit value of conditional expression (2), favorable correction of curvature of field in the zoom range between the telephoto end and the focal length ftm becomes difficult.

Ftm is more preferably set as follows.

$$ftm = fw \times Z^{0.85} \tag{1a}$$

Conditional expression (2) is more preferably set as follows.

$$1.15 < L2\ max/L2t < 2.10 \tag{2a}$$

By satisfying the above configuration, image pickup optical systems of the respective numeral embodiments of the present invention each achieves an image pickup optical system with a wide angle, high magnification and reduction in size and weight while achieving favorable optical performance.

As another embodiment of the present invention, a ratio of focal lengths f2 and f3 of the second lens unit and the third lens unit is defined by conditional expression (3).

$$0.02 < |f2/f3| < 0.20 \tag{3}$$

When the ratio is below a lower limit value of conditional expression (3), a refractive power of the third lens unit becomes excessively small with respect to the refractive power of the second lens unit, and a change in the space between the second lens unit and the third lens unit increases. As a result, the space between the second lens unit and the third lens unit increases at the wide-angle end, and a spherical aberration variation on the telephoto side, and a distortion variation on a wide-angle side increase, so that high magnification becomes difficult to achieve.

When the ratio is above an upper limit value of conditional expression (3), the refractive power of the third lens unit becomes excessively large with respect to the refractive power of the second lens unit, and sensitivity due to a manufacturing error at the telephoto end of the third lens unit increases. In particular, generation amounts of a curvature of field and comatic aberration increase, and manufacturability is worsened.

Conditional expression (3) is more preferably set as follows.

$$0.03 < |f2/f3| < 0.15 \tag{3a}$$

As another embodiment of the present invention, a ratio of the focal lengths f1 and f2 of the first lens unit and the second lens unit is defined by conditional expression (4).

$$5.0 < |f1/f2| < 10.0 \tag{4}$$

When the ratio is above an upper limit of conditional expression (4), the refractive power of the second lens unit becomes excessively strong relatively to the refractive power of the first lens unit, variations in the various aberrations increase, and correction becomes difficult.

When the ratio is below a lower limit of conditional expression (4), the refractive power of the second lens unit becomes excessively weak relatively to the refractive power of the first lens unit, a moving amount at a zooming time of the second lens unit increases, and it becomes difficult to achieve high magnification.

Conditional expression (3) is more preferably set as follows.

$$7.0<|f1/f2|<9.0 \quad (4a)$$

As another embodiment of the present invention, it is defined that the third lens unit always moves to the image side from the wide-angle end to the telephoto end. When the third lens unit takes a locus of movement toward the object side, an aberration variation in a zoom range thereof becomes extremely large, and correction becomes difficult. The third lens unit keeps a suitable space from the second lens unit in the entire zoom range, and thereby favorable aberration correction in the entire zoom range is possible.

As another embodiment of the present invention, it is defined that the second lens unit includes at least one or more negative lens and one or more positive lens. Thereby, favorable aberration correction of a chromatic aberration on the telephoto side is possible.

As another embodiment of the present invention, it is defined that the third lens unit includes a negative lens and a positive lens. Thereby, reduction in weight of the unit that moves at the zooming time can be achieved, and a suitable zoom operation by a drive mechanism is possible.

As another embodiment of the present invention, it is defined that focusing is performed with a lens in the first lens unit. Thereby, it is possible to keep an extending amount at a focusing time constant in any focal length in zooming, and it is possible to simplify the drive mechanism.

Embodiment 1

Figure 1:
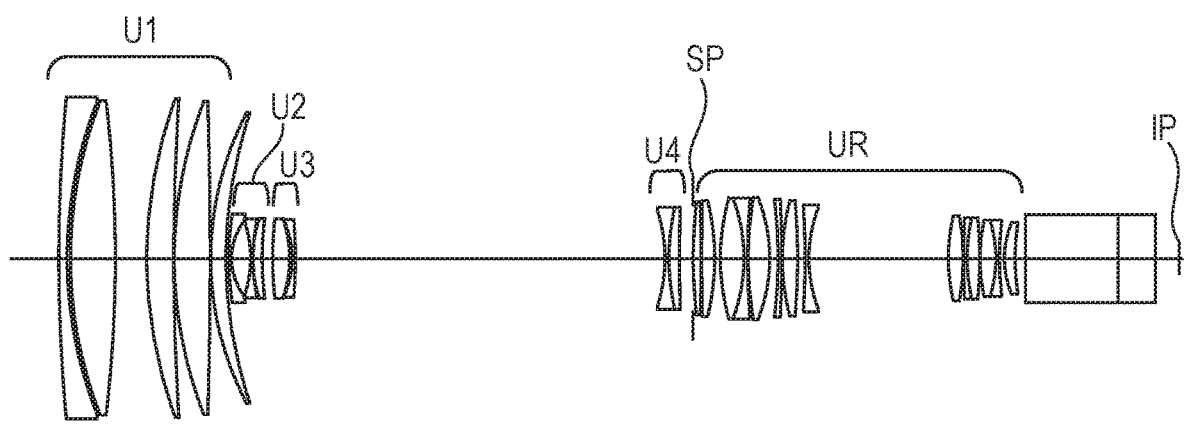
FIG. 1 is a lens sectional view at a time of focusing on an object at infinity at a wide-angle end of a zoom lens of numerical embodiment 1 of the present invention.

FIG. 1 is a lens sectional view at a time of focusing on an object at infinity at a wide-angle end of a zoom lens of numerical embodiment 1 of the present invention.

Reference sign U1 denotes a first lens unit having a positive refractive power and configured not to be moved during zooming. A part of the first lens unit U1 moves to the object side from the image side at a time of focus adjustment to a finite distance from infinity. Reference sign U2 denotes a second lens unit (variator lens unit) having a negative refractive power for zooming and configured to be moved to the image side at a time of zooming to the telephoto end (a long focal length end) from a wide-angle end (a short focal length end). Reference sign U3 denotes a third lens unit having a positive refractive power and configured to be moved at the time of zooming. Reference sign U4 denotes a fourth lens unit (zooming lens unit) having a negative refractive power and configured to be moved at the time of zooming. Reference sign SP denotes an aperture stop. Reference sign UR denotes an imaging lens unit (fixed lens unit) configured not to be moved during zooming. Reference sign IP denotes an image plane, which corresponds to an image pickup surface (or an image plane) of an image pickup element (photoelectric conversion element).

In numerical embodiment 1, spaces among the respective lens units in f=10.69 mm (wide-angle end), f=19.64 mm, f=44.80 mm, a focal length f=222.45 mm (ftm=fw×Z$^{0.835}$) where the space between the second lens unit and the third lens unit is maximum, and f=405.83 mm (telephoto end) are shown.

Next, lens configurations of the respective units of numerical embodiment 1 will be described. Hereinafter, the respective lenses are assumed to be disposed in order from the object side to the image side. U1 is configured by a negative lens and four positive lenses. U2 is configured by a negative lens, a negative lens and a positive lens. U3 is configured by a positive lens and a negative lens. U4 is configured by a cemented lens of a negative lens and a positive lens. UR is configured by a positive lens, a positive lens, a cemented lens of a positive lens and a negative lens, a positive lens, a negative lens, a positive lens, a negative lens, a positive lens, a cemented lens of a negative lens and a positive lens, a cemented lens of a positive lens and a negative lens, and a positive lens.

Figure 2A:
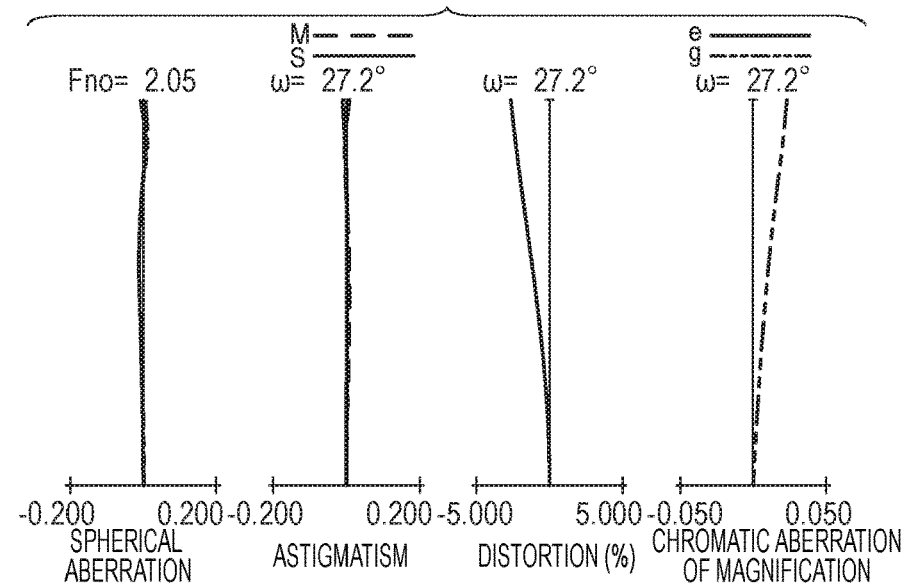
FIG. 2A is an aberration diagram at the wide-angle end of the zoom lens of numerical embodiment 1.
Figure 2B:
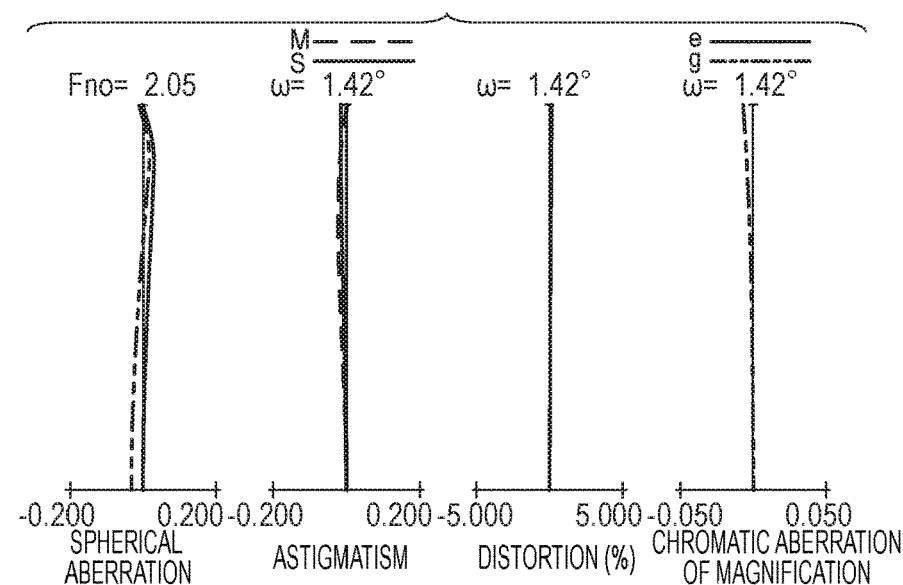
FIG. 2B is an aberration diagram in a focal length of 222.45 mm of the zoom lens of numerical embodiment 1.
Figure 2C:
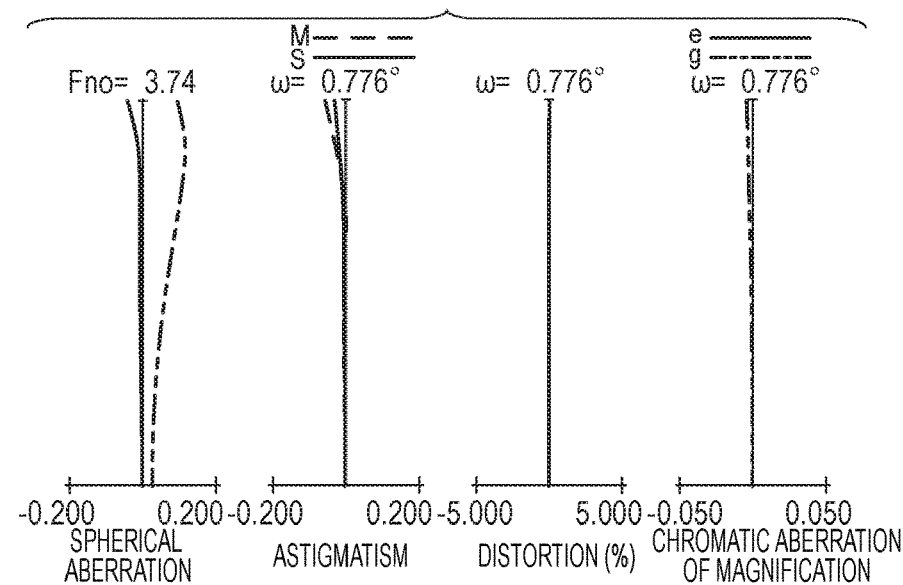
FIG. 2C is an aberration diagram at a telephoto end of the zoom lens of numerical embodiment 1.

FIGS. 2A, 2B and 2C are respectively aberration diagrams at the wide-angle end, the focal length f=222.45 mm, and the telephoto end of embodiment 1. The focal length f=222.45 mm is a zoom position where the space between the second lens unit and the third lens unit becomes maximum.

In the aberration diagrams, spherical aberrations are expressed by e-line and g-line. Astigmatism is expressed by a meridional image plane (ΔM) for e-line and a sagittal image plane (ΔS) for e-line. A chromatic aberration of magnification is expressed by g-line. In the aberration diagrams, the spherical aberration is drawn on a scale of 0.2 mm, the astigmatism is drawn on a scale of 0.2 mm, the distortion is drawn on a scale of 5%, and the chromatic aberration of magnification is drawn on a scale of 0.05 mm. Fno denotes an F number, and ω denotes a half angle of view. Note that the wide-angle end and the telephoto end refer to zoom positions at a time of the second lens unit U2 for zooming being located at both ends of a range in which the second lens unit U2 is mechanically movable on an optical axis. The same applies to numerical embodiments 2 and 3 which will be described later regarding these things. As illustrated in FIGS. 2A to 2C, it is understandable that high optical performance can be realized throughout the zooming range.

Table 1 shows corresponding values to respective conditional expressions in numerical embodiment 1. Numerical embodiment 1 satisfies conditional expressions (2) to (4). Thereby, the present invention achieves an image pickup optical system with a wide angle, high magnification and reduction in size and weight while achieving favorable optical performance.

Embodiment 2

Figure 3:
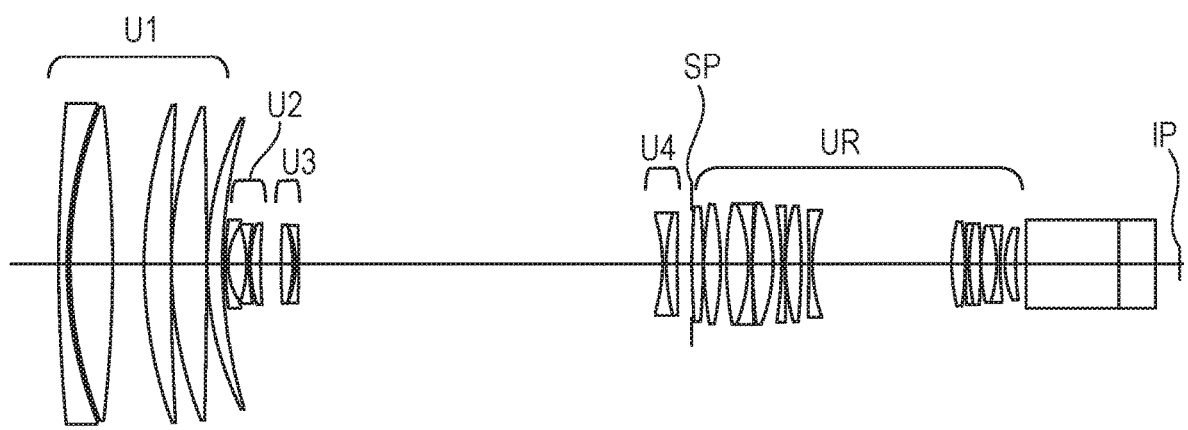
FIG. 3 is a lens sectional view at a time of focusing on an object at infinity at a wide-angle end of a zoom lens of numerical embodiment 2 of the present invention.

FIG. 3 is a lens sectional view at a time of focusing on an object at infinity at a wide-angle end of a zoom lens of numerical embodiment 2 of the present invention.

Reference sign U1 denotes a first lens unit having a positive refractive power and configured not to be moved during zooming. A part of the first lens unit U1 moves to an object side from an image side at a time of focus adjustment to a finite distance from infinity. Reference sign U2 denotes a second lens unit (variator lens unit) having a negative refractive power for zooming and configured to be moved to the image side at a time of zooming to the telephoto end (long focal length end) from the wide-angle end (short focal length end). Reference sign U3 is a third lens unit having a positive refractive power and configured to be moved at a time of zooming. Reference sign U4 is a fourth lens unit (zooming lens unit) having a negative refractive power and configured to be moved at a time of zooming. Reference sign SP denotes an aperture stop. Reference sign UR denotes an imaging lens unit (fixed lens unit) configured not to be moved during zooming. Reference sign IP denotes an image plane, which corresponds to an image pickup surface of an image pickup element (photoelectric conversion element).

In numerical embodiment 2, spaces among the respective lens units in f=10.79 mm (wide-angle end), f=19.40 mm, f=44.80 mm, the focal length f=222.45 mm (ftm=fw×$Z^{0.864}$) at which the space between the second lens unit and the third lens unit is maximum, and f=405.84 mm (telephoto end) are shown.

Next, lens configurations of the respective units in numerical embodiment 2 will be described. Hereinafter, respective lenses are assumed to be disposed in order from the object side to the image side. U1 is configured by a negative lens and four positive lenses. U2 is configured by a negative lens, a negative lens and a positive lens. U3 is configured by a positive lens and a negative lens. U4 is configured by a cemented lens of a negative lens and a positive lens. UR is configured by a positive lens, a positive lens, and a cemented lens of a positive lens and a negative lens, a positive lens, a negative lens, a positive lens, a negative lens, a positive lens, a cemented lens of a negative lens and a positive lens, a cemented lens of a positive lens and a negative lens and a positive lens.

Figure 4A:
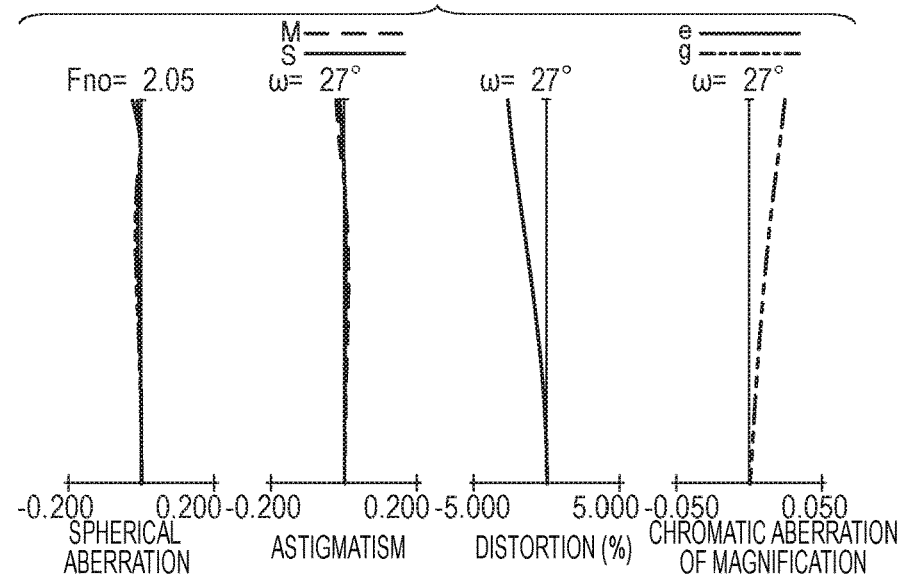
FIG. 4A is an aberration diagram at the wide-angle end of the zoom lens of numerical embodiment 2.
Figure 4B:
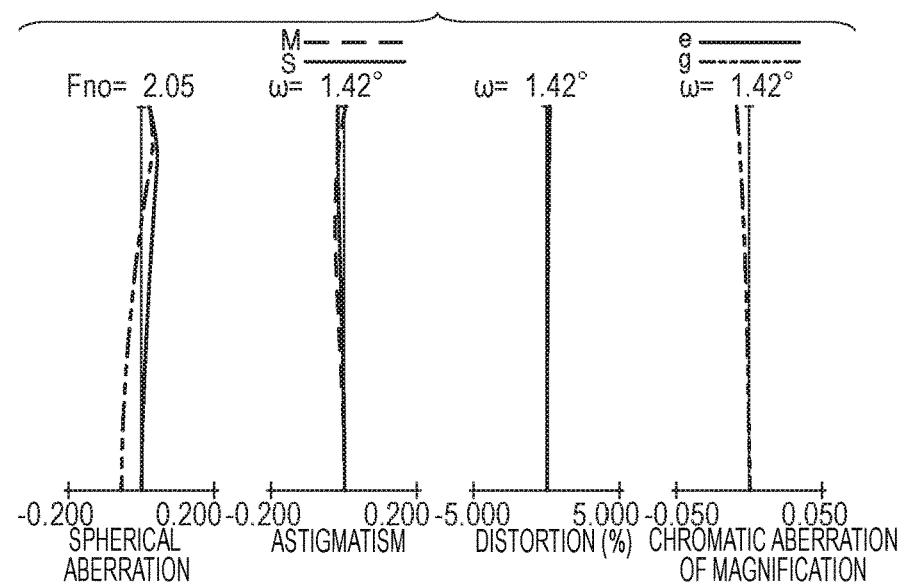
FIG. 4B is an aberration diagram in a focal length of 222.45 mm of the zoom lens of numerical embodiment 2.
Figure 4C:
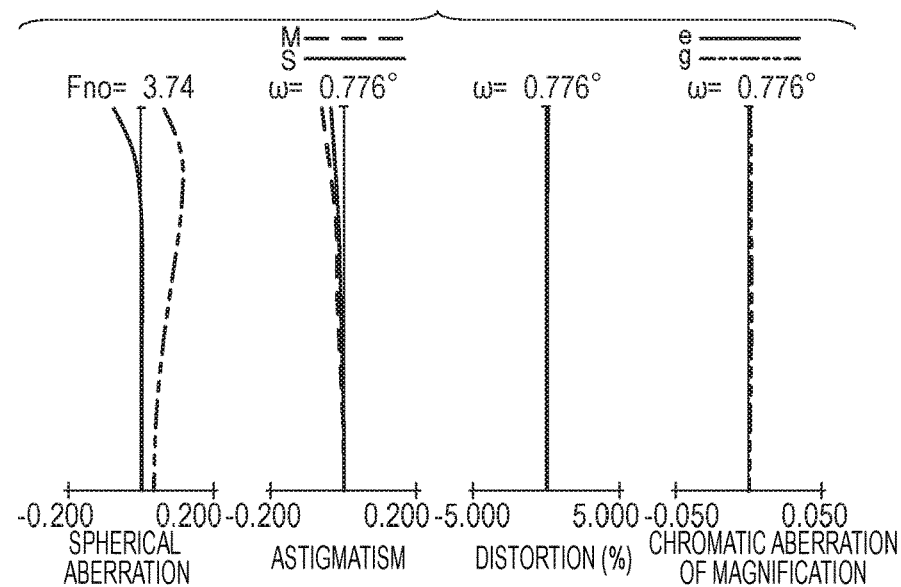
FIG. 4C is an aberration diagram at a telephoto end of the zoom lens of numerical embodiment 2.

FIGS. 4A, 4B and 4C are respectively aberration diagrams at the wide-angle end, the focal length f=222.45 mm, and the telephoto end of embodiment 2. The focal length f=222.45 mm is a zoom position where the space between the second lens unit and the third lens unit becomes maximum.

As illustrated in FIGS. 4A to 4C, it is understandable that high optical performance can be realized throughout the zooming range.

Table 1 shows corresponding values to the respective conditional expressions in numerical embodiment 2. Numerical embodiment 2 satisfies conditional expressions (2) to (4). Thereby, the present invention achieves an image pickup optical system with a wide angle, high magnification and reduction in size and weight while achieving favorable optical performance.

Embodiment 3

Figure 5:
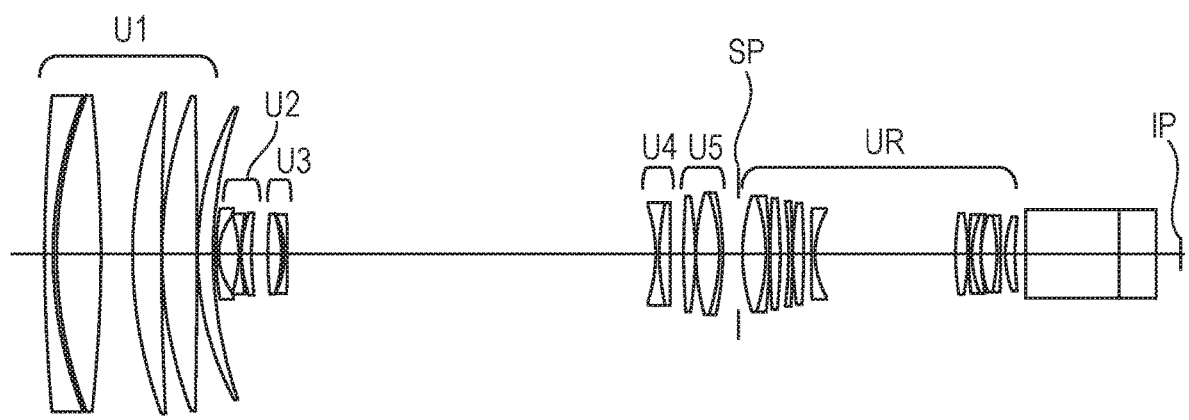
FIG. 5 is a lens sectional view at a time of focusing on an object at infinity at a wide-angle end of a zoom lens of numerical embodiment 3 of the present invention.

FIG. 5 is a lens sectional view at a time of focusing on an object at infinity at a wide-angle end of a zoom lens of numerical embodiment 3 of the present invention.

Reference sign U1 denotes a first lens unit having a positive refractive power and configured not to be moved during zooming. A part of the first lens unit U1 moves to an object side from an image side at a time of focus adjustment to a finite distance from infinity. Reference sign U2 denotes a second lens unit (variator lens unit) having a negative refractive power for zooming and configured to be moved to the image side at a time of zooming to the telephoto end (long focal length end) from a wide-angle end (short focal length end). Reference sign U3 denotes a third lens unit having a positive refractive power and configured to be moved at a time of zooming. Reference sign U4 denotes a fourth lens unit (zooming lens unit) having a negative refractive power and configured to be moved at the time of zooming. Reference sign U5 denotes a fifth lens unit U5 (zooming lens unit) having a positive refractive power, and configured to be moved in association with the second lens unit U2 and correct an image plane variation following zooming. Reference sign SP is an aperture stop. Reference sign UR denotes an imaging lens unit (fixed lens unit) configured not to be moved during zooming. Reference sign IP denotes the image plane, which corresponds to an image pickup surface of an image pickup element (photoelectric conversion element).

In numerical embodiment 3, spaces among the respective lens units in f=10.30 mm (wide-angle end), f=19.90 mm, f=44.80 mm, and a focal length f=222.45 mm (ftm=fw×$Z^{0.836}$) at which the space between the second lens unit and the third lens unit is maximum and f=405.80 mm (telephoto end) are shown.

Next, lens configurations of the respective units in numeral embodiment 3 will be described. U1 is configured by a negative lens and four positive lenses. U2 is configured by a negative lens, a negative lens and a positive lens. U3 is configured by a positive lens and a negative lens. U4 is configured by a cemented lens of a negative lens and a positive lens. U5 is configured by a positive lens, and a cemented lens of a positive lens and a negative lens. UR is configured by a cemented lens of a positive lens and a negative lens, a positive lens, a negative lens, a positive lens, a negative lens, a positive lens, a cemented lens of a negative lens and a positive lens, a cemented lens of a positive lens and a negative lens, and a positive lens.

Figure 6A:
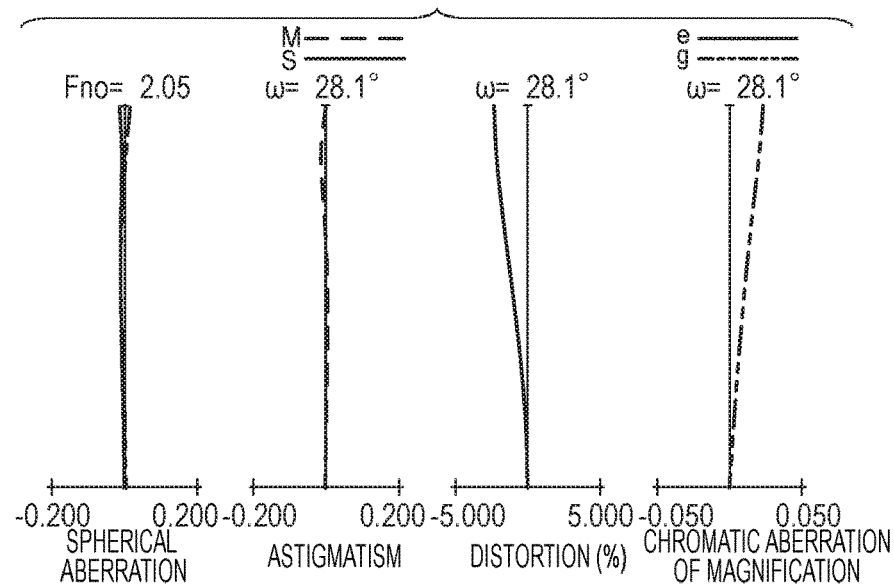
FIG. 6A is an aberration diagram at the wide-angle end of the zoom lens of numerical embodiment 3.
Figure 6B:
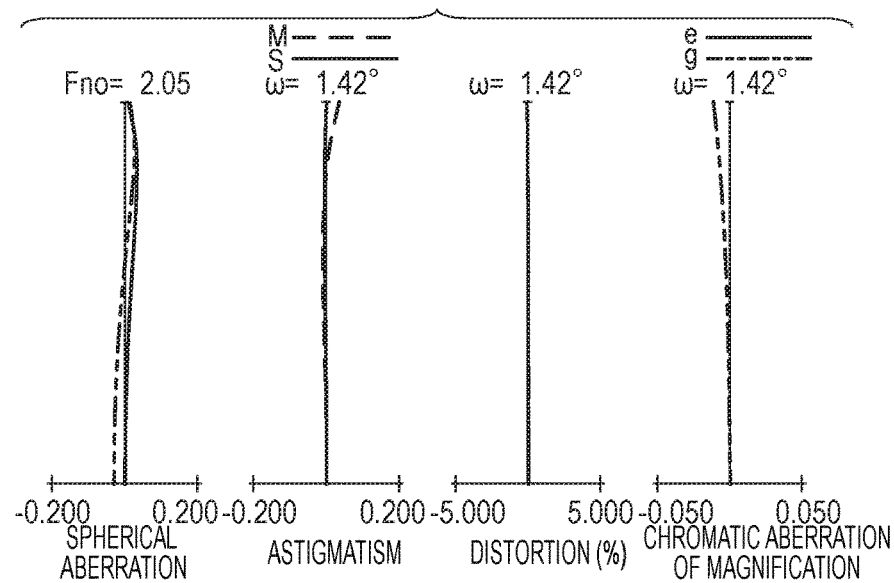
FIG. 6B is an aberration diagram in a focal length of 222.45 mm of the zoom lens of numerical embodiment 3.
Figure 6C:
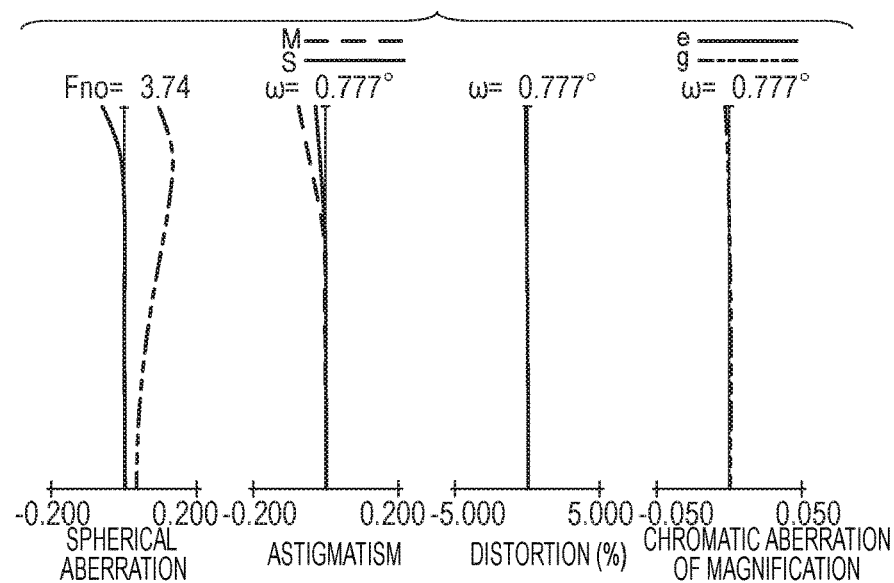
FIG. 6C is an aberration diagram at a telephoto end of the zoom lens of numerical embodiment 3.

FIGS. 6A, 6B and 6C are respectively aberration diagrams at the wide-angle end, the focal length f=222.45 mm, and the telephoto end in embodiment 3. The focal length f=222.45 mm is a zoom position where the space between the second lens unit and the third lens unit becomes maximum.

As illustrated in FIGS. 6A, 6B and 6C, it is understandable that high optical performance can be realized throughout a zooming range.

Table 1 shows corresponding values of the respective conditional expressions to the zoom lens in numerical embodiment 3. The zoom lens in numerical embodiment 3 satisfies conditional expressions (2) to (4). Thereby, a zoom lens and an image pickup apparatus that make the wide angle, high magnification and reduction in size and weight, in particular high performance in the focal length range from the telephoto end to middle of zoom compatible can be provided.

<Image Pickup Apparatus>

Figure 8:
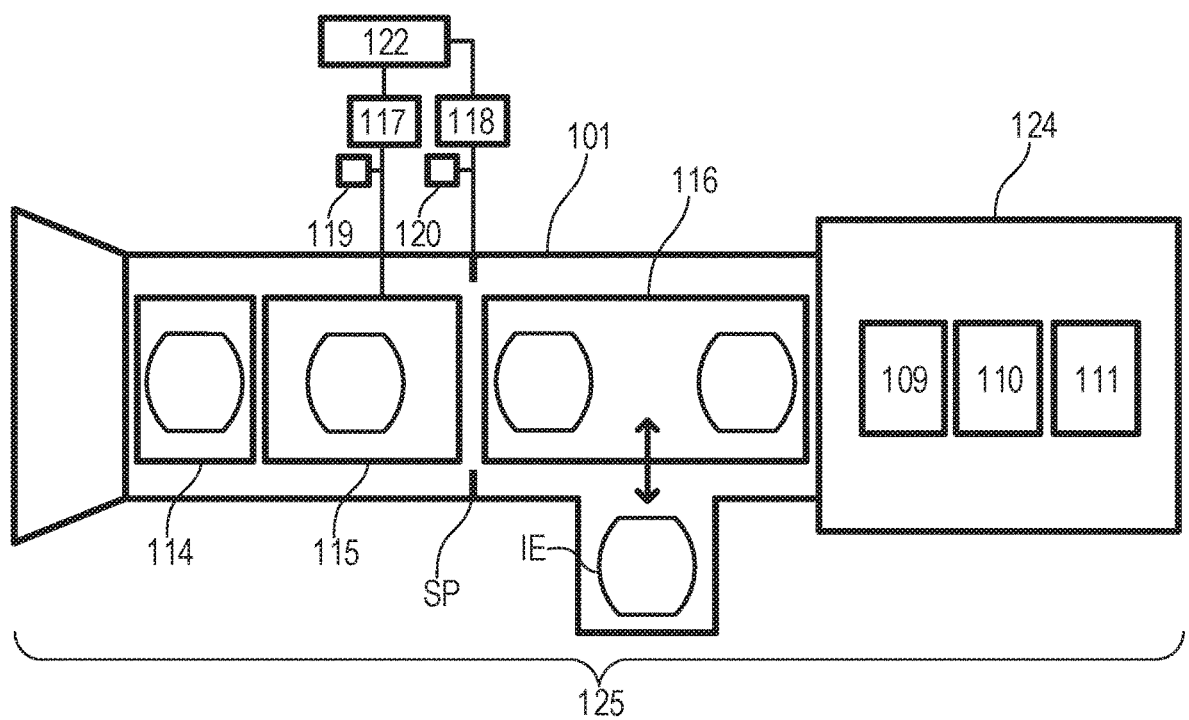
FIG. 8 is a schematic view of a main part of an image pickup apparatus of the present invention.

Next, the image pickup apparatus using the respective zoom lenses described above as the image pickup optical system will be described. FIG. 8 is a schematic view of a main part of the image pickup apparatus (television camera system) using the zoom lenses of the respective embodiments as the image pickup optical system. In FIG. 8, reference sign 101 denotes the zoom lens of any one of embodiments 1 to 3.

Reference sign 124 denotes a camera. The zoom lens 101 is configured to be attachable to and detachable from the camera 124. Reference sign 125 denotes an image pickup apparatus configured by fitting the zoom lens 101 to the camera 124. The zoom lens 101 has a first lens unit 114, a zooming portion 115 that moves on an optical axis at a time of zooming, and an imaging lens unit 116 for imaging. Reference sign SP is an aperture stop. The imaging lens unit 116 configured to be fixed during zooming and focusing has a zooming optical system IE that is insertable to and extractable from an optical path.

The zooming portion 115 includes a drive mechanism to be driven in an optical axis direction. Reference signs 117 and 118 denote drive units such as a motor that electrically drive the zooming portion 115 and the aperture stop SP. Reference signs 119 and 120 denote detectors such as an encoder, a potentiometer, or a photosensor for detecting a position on the optical axis of the respective lens units in the zooming portion 115 and an aperture diameter of the aperture stop SP. Note that driving loci of the respective lens units in the zooming portion 115 may be either mechanical loci of a helicoid and a cam, or electric loci by an ultrasonic motor or the like. In the camera 124, reference sign 109 denotes a glass block corresponding to an optical filter or a color separation prism in the camera 124, reference sign 110 denotes a solid image pickup element (photoelectric conversion element) such as a CCD sensor and a CMOS sensor that receives a subject image that is formed by the zoom lens 101. Further, reference signs 111 and 122 are CPUs that control various drives of the camera 124 and the zoom lens main body 101. By applying the zoom lens of the present invention to the television camera in this way, an image pickup apparatus having high optical performance is realized.

While preferable embodiments of the present invention have been described thus far, the present invention is not limited to these embodiments, and various modifications and changes can be made within the range of the gist of the present invention.

In the following respective numerical embodiments, "i" denotes an $i^{th}$ surface from the object side. "ri" denotes a radius of curvature of the $i^{th}$ surface from the object side, "di" denotes a space between the $i^{th}$ surface and an $i+1^{th}$ surface, and "ndi" and "vdi" denote a refractive index and an Abbe number of an optical medium between the $i^{th}$ surface and the $i+1^{th}$ surface. The last three surfaces are glass blocks such as filters. The focal length, the F number and the angle of view respectively express values at a time of focusing on the object at infinity. BF denotes a value obtained by subjecting a length to an image plane from a final surface of the glass block to air conversion.

An aspherical shape is expressed by the following expression by setting an X-axis in an optical axis direction, an H-axis in a perpendicular direction to the optical axis, a traveling direction of light as positive, R as a paraxial radius of curvature, k as a conical constant, and A3, A4, A5, A6, A7, A8, A9, A10, A11, A12, A13, A14, A15 and A16 as aspherical coefficients respectively.

$$X = \frac{H^2/R}{1+\sqrt{1-(1+k)(H/R)^2}} + A4H^4 + A6H^6 + A8H^8 + A10H^{10} + A12H^{12} + A14H^{14} + A16H^{16}$$
$$A3H^3 + A5H^5 + A7H^7 + A9H^9 + A11H^{11} + A13H^{13} + A15H^{15}$$ [Expression 1]

Further, for example "e-Z" means "×10$^{-z}$". Symbol * attached to a surface number indicates that the surface is aspherical surface.

Numerical Embodiment 1

| Unit mm | | | | |
|---|---|---|---|---|
| Surface data | | | | |
| Surface number | r | d | nd | vd |
| 1 | 603.746 | 3.00 | 1.83481 | 42.7 |
| 2 | 149.343 | 1.17 | | |
| 3 | 151.821 | 16.00 | 1.43387 | 95.1 |
| 4 | −476.510 | 11.27 | | |
| 5 | 162.782 | 9.59 | 1.43387 | 95.1 |
| 6 | 865.034 | 0.20 | | |
| 7 | 151.903 | 12.79 | 1.43387 | 95.1 |
| 8 | −1774.749 | 0.19 | | |
| 9 | 110.181 | 5.43 | 1.43387 | 95.1 |
| 10 | 158.632 | (Variable) | | |
| 11 | 91.298 | 1.00 | 2.00100 | 29.1 |
| 12 | 22.069 | 6.84 | | |
| 13 | −41.298 | 0.90 | 1.77250 | 49.6 |
| 14 | 77.269 | −0.25 | | |
| 15 | 41.356 | 3.44 | 1.95906 | 17.5 |
| 16 | 109.190 | (Variable) | | |
| 17 | 130.634 | 6.08 | 1.80810 | 22.8 |
| 18 | −41.880 | 1.14 | | |
| 19 | −30.783 | 1.10 | 1.80100 | 35.0 |
| 20 | −167.860 | (Variable) | | |
| 21 | −53.487 | 1.30 | 1.71999 | 50.2 |
| 22 | 76.831 | 3.90 | 1.84666 | 23.9 |
| 23 | 1339.758 | (Variable) | | |
| 24 (Stop) | ∞ | 0.00 | | |
| 25* | 139.965 | 2.84 | 1.60311 | 60.6 |
| 26 | −452.460 | 0.20 | | |
| 27 | 769.963 | 4.64 | 1.48749 | 70.2 |
| 28 | −84.555 | 2.02 | | |
| 29 | 77.299 | 8.45 | 1.49700 | 81.5 |
| 30 | −59.957 | 1.30 | 1.84666 | 23.9 |
| 31 | 281.217 | 0.17 | | |
| 32 | 127.416 | 7.70 | 1.51633 | 64.1 |
| 33 | −58.122 | 3.00 | | |
| 34 | −167.464 | 1.30 | 1.81600 | 46.6 |
| 35 | −387.187 | 0.15 | | |
| 36 | 77.374 | 5.50 | 1.84666 | 23.8 |
| 37 | −218.627 | 2.67 | | |
| 38 | −298.344 | 1.30 | 1.77250 | 49.6 |
| 39 | 48.888 | 50.00 | | |
| 40 | 63.176 | 5.30 | 1.54814 | 45.8 |
| 41 | −86.826 | 0.20 | | |
| 42 | 386.522 | 1.20 | 1.88300 | 40.8 |
| 43 | 61.277 | 4.51 | 1.49700 | 81.5 |
| 44 | −148.629 | 0.10 | | |
| 45 | 59.807 | 5.76 | 1.43875 | 94.9 |
| 46 | −43.398 | 1.20 | 1.88300 | 40.8 |
| 47 | 100.883 | 1.75 | | |
| 48 | 32.141 | 3.85 | 1.51742 | 52.4 |
| 49 | 81.139 | 3.80 | | |
| 50 | ∞ | 33.00 | 1.60859 | 46.4 |
| 51 | ∞ | 13.20 | 1.51680 | 64.2 |
| 52 | ∞ | (Variable) | | |
| Image plane | ∞ | | | |

| Aspherical surface data | | | |
|---|---|---|---|
| The 25$^{th}$ surface | | | |
| K = −4.69710e+000 | A4 = −1.94145e−006 | A6 = −7.36418e−011 | A8 = −4.50317e−013 |

| Various data | | | | |
|---|---|---|---|---|
| Zoom ratio 37.95 | | | | |
| Focal length | 10.69 | 19.64 | 44.80 | 222.45 | 405.83 |
| F number | 2.05 | 2.05 | 2.05 | 2.05 | 3.74 |
| Half angle of view | 27.22 | 15.65 | 7.00 | 1.42 | 0.78 |
| Image height | 5.50 | 5.50 | 5.50 | 5.50 | 5.50 |
| Lens entire length | 400.83 | 400.83 | 400.83 | 400.83 | 400.83 |
| BF | 8.89 | 8.89 | 8.89 | 8.89 | 8.89 |
| d10 | 0.99 | 42.78 | 80.85 | 117.91 | 123.86 |
| d16 | 3.77 | 5.12 | 5.34 | 3.61 | 3.07 |
| d20 | 132.16 | 83.50 | 37.60 | 3.50 | 13.00 |
| d23 | 4.82 | 10.34 | 17.95 | 16.72 | 1.80 |
| d52 | 8.89 | 8.89 | 8.89 | 8.89 | 8.89 |
| Entrance pupil position | 74.89 | 170.21 | 384.58 | 1397.04 | 2137.97 |
| Exit pupil position | −2947.96 | −2947.96 | −2947.96 | −2947.96 | −2947.96 |

-continued

Unit mm

| | | | | | |
|---|---|---|---|---|---|
| Front principal point position | 85.55 | 189.72 | 428.70 | 1602.76 | 2488.11 |
| Rear principal point position | −1.80 | −10.74 | −35.91 | −213.55 | −396.94 |

Zoom lens unit data

| Unit | Initial surface | Focal length | Lens configuration length | Front principal point position | Rear principal point position |
|---|---|---|---|---|---|
| 1 | 1 | 161.80 | 59.64 | 32.81 | −11.21 |
| 2 | 11 | −18.98 | 11.93 | 2.80 | −5.94 |
| 3 | 17 | 199.60 | 8.33 | −5.22 | −10.02 |
| 4 | 21 | −80.29 | 5.20 | 0.04 | −2.81 |
| 5 | 24 | 73.65 | 165.11 | 71.76 | −154.40 |

Numerical Embodiment 2

Unit mm

Surface data

| Surface number | r | d | nd | vd |
|---|---|---|---|---|
| 1 | 590.424 | 3.00 | 1.83481 | 42.7 |
| 2 | 150.235 | 1.13 | | |
| 3 | 152.134 | 15.19 | 1.43387 | 95.1 |
| 4 | −490.638 | 11.26 | | |
| 5 | 164.666 | 9.55 | 1.43387 | 95.1 |
| 6 | 930.648 | 0.20 | | |
| 7 | 151.351 | 12.60 | 1.43387 | 95.1 |
| 8 | −2190.322 | 0.19 | | |
| 9 | 116.382 | 5.44 | 1.43387 | 95.1 |
| 10 | 173.363 | (Variable) | | |
| 11 | 103.098 | 1.00 | 2.00100 | 29.1 |
| 12 | 23.602 | 6.65 | | |
| 13 | −42.186 | 0.90 | 1.77250 | 49.6 |
| 14 | 79.642 | 0.52 | | |
| 15 | 46.767 | 3.56 | 1.95906 | 17.5 |
| 16 | 184.467 | (Variable) | | |
| 17 | 219.154 | 4.47 | 1.80810 | 22.8 |
| 18 | −45.130 | 1.00 | | |
| 19 | −34.174 | 1.10 | 1.80100 | 35.0 |
| 20 | −265.227 | (Variable) | | |
| 21 | −55.168 | 1.30 | 1.71999 | 50.2 |
| 22 | 71.954 | 3.96 | 1.84666 | 23.9 |
| 23 | 743.240 | (Variable) | | |
| 24 (Stop) | ∞ | 0.00 | | |
| 25* | 184.419 | 4.10 | 1.60311 | 60.6 |
| 26 | −208.322 | 0.20 | | |
| 27 | 112.882 | 6.02 | 1.48749 | 70.2 |
| 28 | −100.142 | 2.02 | | |
| 29 | 107.999 | 7.87 | 1.49700 | 81.5 |
| 30 | −56.967 | 1.30 | 1.84666 | 23.9 |
| 31 | 313.988 | 0.17 | | |
| 32 | 170.630 | 7.40 | 1.51633 | 64.1 |
| 33 | −55.176 | 3.00 | | |
| 34 | −125.241 | 1.30 | 1.81600 | 46.6 |
| 35 | 2174.451 | 0.15 | | |
| 36 | 77.244 | 5.61 | 1.84666 | 23.8 |
| 37 | −196.194 | 2.67 | | |
| 38 | −1481.232 | 1.30 | 1.77250 | 49.6 |
| 39 | 53.296 | 50.00 | | |
| 40 | 59.466 | 4.85 | 1.54814 | 45.8 |
| 41 | −93.867 | 0.20 | | |
| 42 | 383.506 | 1.20 | 1.88300 | 40.8 |
| 43 | 66.889 | 4.15 | 1.49700 | 81.5 |
| 44 | −205.218 | 0.10 | | |
| 45 | 59.930 | 5.63 | 1.43875 | 94.9 |
| 46 | −42.533 | 1.20 | 1.88300 | 40.8 |
| 47 | 101.744 | 1.75 | | |
| 48 | 32.141 | 3.81 | 1.51742 | 52.4 |
| 49 | 83.533 | 3.80 | | |
| 50 | ∞ | 33.00 | 1.60859 | 46.4 |
| 51 | ∞ | 13.20 | 1.51680 | 64.2 |
| 52 | ∞ | (Variable) | | |
| Image plane | ∞ | | | |

Aspherical surface data
The 25$^{th}$ surface

| K = −4.74407e+000 | A4 = −1.97539e−006 | A6 = −1.68534e−010 | A8 = −5.40411e−013 |
|---|---|---|---|

Various data
Zoom ratio 37.60

| | | | | | |
|---|---|---|---|---|---|
| Focal length | 10.79 | 19.40 | 44.80 | 222.45 | 405.84 |
| F number | 2.05 | 2.05 | 2.05 | 2.05 | 3.74 |
| Half angle of view | 27.00 | 15.83 | 7.00 | 1.42 | 0.78 |
| Image height | 5.50 | 5.50 | 5.50 | 5.50 | 5.50 |
| Lens entire length | 401.74 | 401.74 | 401.74 | 401.74 | 401.74 |
| BF | 8.90 | 8.90 | 8.90 | 8.90 | 8.90 |
| d10 | 0.99 | 41.76 | 80.71 | 117.69 | 123.57 |
| d16 | 7.34 | 9.13 | 9.08 | 6.27 | 3.07 |
| d20 | 130.33 | 82.47 | 36.01 | 3.57 | 15.40 |
| d23 | 5.18 | 10.48 | 18.04 | 16.31 | 1.80 |
| d52 | 8.90 | 8.90 | 8.90 | 8.90 | 8.90 |
| Entrance pupil position | 74.58 | 167.14 | 386.02 | 1421.92 | 2188.33 |
| Exit pupil position | −2663.53 | −2663.53 | −2663.53 | −2663.53 | −2663.53 |
| Front principal point position | 85.33 | 186.40 | 430.07 | 1625.85 | 2532.54 |
| Rear principal point position | −1.89 | −10.50 | −35.90 | −213.55 | −396.94 |

Zoom lens unit data

| Unit | Initial surface | Focal length | Lens configuration length | Front principal point position | Rear principal point position |
|---|---|---|---|---|---|
| 1 | 1 | 161.80 | 58.55 | 32.03 | −11.34 |
| 2 | 11 | −20.94 | 12.63 | 2.30 | −7.31 |
| 3 | 17 | 579.02 | 6.56 | −13.73 | −17.36 |
| 4 | 21 | −80.29 | 5.26 | 0.16 | −2.73 |
| 5 | 24 | 74.10 | 165.99 | 71.97 | −155.57 |

Numerical Embodiment 3

Unit mm

Surface data

| Surface number | r | d | nd | vd |
|---|---|---|---|---|
| 1 | 589.841 | 3.00 | 1.83481 | 42.7 |
| 2 | 149.885 | 1.30 | | |
| 3 | 152.351 | 15.65 | 1.43387 | 95.1 |
| 4 | −492.047 | 11.23 | | |

-continued

Unit mm

| | | | | |
|---|---|---|---|---|
| 5 | 160.592 | 10.21 | 1.43387 | 95.1 |
| 6 | 1087.847 | 0.20 | | |
| 7 | 153.990 | 12.42 | 1.43387 | 95.1 |
| 8 | −2592.277 | 0.23 | | |
| 9 | 108.925 | 5.43 | 1.43387 | 95.1 |
| 10 | 153.921 | (Variable) | | |
| 11 | 90.881 | 1.00 | 2.00100 | 29.1 |
| 12 | 21.685 | 7.05 | | |
| 13 | −43.110 | 0.90 | 1.77250 | 49.6 |
| 14 | 73.380 | 0.08 | | |
| 15 | 40.814 | 3.56 | 1.95906 | 17.5 |
| 16 | 114.711 | (Variable) | | |
| 17 | 138.479 | 4.85 | 1.80810 | 22.8 |
| 18 | −42.915 | 1.10 | | |
| 19 | −31.971 | 1.10 | 1.80100 | 35.0 |
| 20 | −270.762 | (Variable) | | |
| 21 | −52.617 | 1.30 | 1.71999 | 50.2 |
| 22 | 79.855 | 3.85 | 1.84666 | 23.9 |
| 23 | 2381.914 | (Variable) | | |
| 24* | 201.600 | 4.20 | 1.60311 | 60.6 |
| 25 | −119.087 | 0.20 | | |
| 26 | 76.463 | 8.25 | 1.48749 | 70.2 |
| 27 | −63.856 | 1.30 | 1.84666 | 23.9 |
| 28 | −92.933 | (Variable) | | |
| 29 (Stop) | ∞ | 1.52 | | |
| 30 | 63.585 | 8.28 | 1.49700 | 81.5 |
| 31 | −63.649 | 1.30 | 1.84666 | 23.9 |
| 32 | −172.495 | 0.17 | | |
| 33 | 261.323 | 3.62 | 1.51633 | 64.1 |
| 34 | −191.389 | 3.00 | | |
| 35 | −141.688 | 1.30 | 1.81600 | 46.6 |
| 36 | −372.106 | 0.15 | | |
| 37 | 118.491 | 3.89 | 1.84666 | 23.8 |
| 38 | −238.497 | 2.67 | | |
| 39 | 577.747 | 1.30 | 1.77250 | 49.6 |
| 40 | 29.900 | 50.00 | | |
| 41 | 81.659 | 4.45 | 1.54814 | 45.8 |
| 42 | −70.510 | 0.20 | | |
| 43 | 111.947 | 1.20 | 1.88300 | 40.8 |
| 44 | 34.882 | 3.12 | 1.49700 | 81.5 |
| 45 | 62.069 | 0.10 | | |
| 46 | 37.862 | 5.68 | 1.43875 | 94.9 |
| 47 | −57.727 | 1.20 | 1.88300 | 40.8 |
| 48 | −907.191 | 1.75 | | |
| 49 | 37.491 | 3.42 | 1.51742 | 52.4 |
| 50 | 109.322 | 3.80 | | |
| 51 | ∞ | 33.00 | 1.60859 | 46.4 |
| 52 | ∞ | 13.20 | 1.51680 | 64.2 |
| 53 | ∞ | (Variable) | | |
| Image plane | ∞ | | | |

Aspherical surface data
The 24$^{th}$ surface

K = −1.04816e+001   A4 = −1.41939e-006   A6 = 1.08503e-010   A8 = −4.54085e-014

Various data
Zoom ratio 39.40

| | | | | | |
|---|---|---|---|---|---|
| Focal length | 10.30 | 19.90 | 44.80 | 222.45 | 405.80 |
| F number | 2.05 | 2.05 | 2.05 | 2.05 | 3.74 |
| Half angle of view | 28.10 | 15.45 | 7.00 | 1.42 | 0.78 |
| Image height | 5.50 | 5.50 | 5.50 | 5.50 | 5.50 |
| Lens entire length | 403.47 | 403.47 | 403.47 | 403.47 | 403.47 |
| BF | 8.90 | 8.90 | 8.90 | 8.90 | 8.90 |
| d10 | 1.04 | 41.78 | 78.49 | 118.90 | 124.31 |
| d16 | 5.78 | 2.64 | 3.28 | 4.71 | 3.06 |
| d20 | 130.87 | 76.49 | 29.46 | 8.03 | 17.52 |
| d23 | 4.70 | 11.86 | 20.99 | 15.63 | 1.80 |
| d28 | 5.43 | 15.06 | 15.61 | 0.56 | 1.14 |
| d53 | 8.90 | 8.90 | 8.90 | 8.90 | 8.90 |
| Entrance pupil position | 74.76 | 167.31 | 365.80 | 1651.68 | 2695.30 |
| Exit pupil position | 414.81 | 414.81 | 414.81 | 414.81 | 414.81 |
| Front principal point position | 85.32 | 188.18 | 415.55 | 1996.03 | 3506.78 |
| Rear principal point position | −1.40 | −11.00 | −35.90 | −213.55 | −396.90 |

Zoom lens unit data

| Unit | Initial surface | Focal length | Lens configuration length | Front principal point position | Rear principal point position |
|---|---|---|---|---|---|
| 1 | 1 | 161.80 | 59.68 | 32.54 | −11.56 |
| 2 | 11 | −19.22 | 12.59 | 2.63 | −6.74 |
| 3 | 17 | 300.76 | 7.04 | −8.98 | −12.94 |
| 4 | 21 | −80.29 | 5.15 | −0.02 | −2.84 |
| 5 | 24 | 57.19 | 13.95 | 3.79 | −5.47 |
| 6 | 29 | 75.25 | 148.32 | 89.71 | −52.21 |

TABLE 1

Corresponding values of respective conditional expressions in numerical embodiments 1 to 3

| Conditional expression number | Conditional expression | Numerical embodiment 1 | Numerical embodiment 2 | Numerical embodiment 3 |
|---|---|---|---|---|
| (2) | L2tm/L2t | 1.18 | 2.04 | 1.54 |
| (3) | \|f2/f3\| | 0.10 | 0.04 | 0.06 |
| (4) | \|f1/f2\| | 8.53 | 7.73 | 8.42 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-198257, filed Oct. 12, 2017, which is hereby incorporated by reference herein in its entirety.

What is claimed is:

1. A zoom lens comprising, in order from an object side to an image side, a first lens unit having a positive refractive power and configured not to be moved for zooming, a second lens unit having a negative refractive power and configured to be moved for zooming, a third lens unit having a positive refractive power and configured to be moved for zooming, a zooming lens group including at least one lens unit configured to be moved for zooming, and an imaging lens unit having a positive refractive power and configured not to be moved for zooming, wherein
the third lens unit includes at least a single lens having a positive refractive power, and at least a single lens having a negative refractive power,
the second lens unit and the third lens unit are configured to be moved from the object side to the image side for zooming from a wide-angle end to a telephoto end, and
conditional expressions $1.10 < L2\,max/L2t < 2.20$, and $7.0 < |f1/f2| < 10.0$ are satisfied where fw is a focal length of the zoom lens at the wide-angle end, Z is a zoom ratio of the zoom lens, ftm is a focal length of the zoom lens in an intermediate zoom state of the zoom lens obtained by an expression $fw \times Z^{0.84}$, L2 max is a maximum interval between the second lens unit and the third lens unit in a zoom range from the telephoto end to the intermediate zoom state, L2t is an interval between the second lens unit and the third lens unit at the telephoto end, f1 is a focal length of the first lens unit, and f2 is a focal length of the second lens unit.

2. The zoom lens according to claim 1, wherein a conditional expression $$0.02 < |f2/f3| < 0.20$$

is satisfied where f3 is the focal length of the third lens unit.

3. The zoom lens according to claim 1, wherein the third lens unit is configured to be moved monotonously from the object side to the image side for zooming from the wide-angle end to the telephoto end.

4. The zoom lens according to claim 1, wherein focusing is performed by movement of at least a part of the first lens unit.

5. The zoom lens according to claim 1, wherein the imaging lens unit includes a stop.

6. An image pickup apparatus comprising:
a zoom lens including, in order from an object side to an image side, a first lens unit having a positive refractive power and configured not to be moved for zooming, a second lens unit having a negative refractive power and configured to be moved for zooming, a third lens unit having a positive refractive power and configured to be moved for zooming, a zooming lens group including at least one lens unit configured to be moved for zooming, and an imaging lens unit having a positive refractive power and configured not to be moved for zooming, wherein
the third lens unit includes at least a single lens having a positive refractive power, and at least a single lens having a negative refractive power,
the second lens unit and the third lens unit are moved from the object side to the image side for zooming from a wide-angle end to a telephoto end, and
conditional expressions $$1.10 < L2\,max/L2t < 2.20,\text{ and}$$

$$7.0 < |f1/f2| < 10.0$$

are satisfied where fw is a focal length of the zoom lens at the wide-angle end, Z is a zoom ratio of the zoom lens, ftm is a focal length of the zoom lens in an intermediate zoom state of the zoom lens obtained by an expression $fw \times Z^{0.84}$, L2 max is a maximum interval between the second lens unit and the third lens unit in a zoom range from the telephoto end to the intermediate zoom state, L2t is an interval between the second lens unit and the third lens unit at the telephoto end, f1 is a focal length of the first lens unit, and f2 is a focal length of the second lens unit; and
an image pickup element configured to pick up an image formed by the zoom lens.

* * * * *